(12) United States Patent
Sakamoto et al.

(10) Patent No.: US 7,342,378 B2
(45) Date of Patent: Mar. 11, 2008

(54) SYSTEM AND METHOD FOR DRIVING SYNCHRONOUS MOTOR

(75) Inventors: Kiyoshi Sakamoto, Hitachi (JP);
Tsunehiro Endo, Hitachiota (JP);
Hidefumi Shirahama, Hitachi (JP);
Yoshiaki Ajima, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/505,320

(22) Filed: Aug. 17, 2006

(65) Prior Publication Data

US 2007/0120519 A1    May 31, 2007

(30) Foreign Application Priority Data

Nov. 30, 2005   (JP)   ............................. 2005-344856

(51) Int. Cl.
*H02P 1/46*    (2006.01)

(52) U.S. Cl. ........................ 318/717; 318/700; 318/718; 318/722

(58) Field of Classification Search ................ 318/717, 318/700, 718, 722, 80; 324/127; 388/907.2, 388/908, 928.1
See application file for complete search history.

(56) References Cited

U.S. PATENT DOCUMENTS

2003/0062887 A1*  4/2003  Lau ............................. 324/127

FOREIGN PATENT DOCUMENTS

| JP | 11-341869 | 12/1999 |
|---|---|---|
| JP | 2002-095283 | 3/2002 |
| JP | 2004-343913 | 12/2004 |

* cited by examiner

*Primary Examiner*—Karen Masih
(74) *Attorney, Agent, or Firm*—Antonelli, Terry, Stout & Kraus, LLP.

(57) ABSTRACT

A driving apparatus of a synchronous motor fixes all the switching devices of an inverter at OFF in accordance with a value of an all-OFF control pulse signal outputted by a pulse generator. A motor current keeps flowing through free wheel diodes for a predetermined period even after all the switching devices shift to the OFF state. Therefore, pulse generator changes an induced voltage detection signal to an H (high) level after the passage of the time in which a motor current drops down to zero. A terminal voltage of the motor is taken in to acquire an induced voltage and a rotor position is estimated.

11 Claims, 13 Drawing Sheets

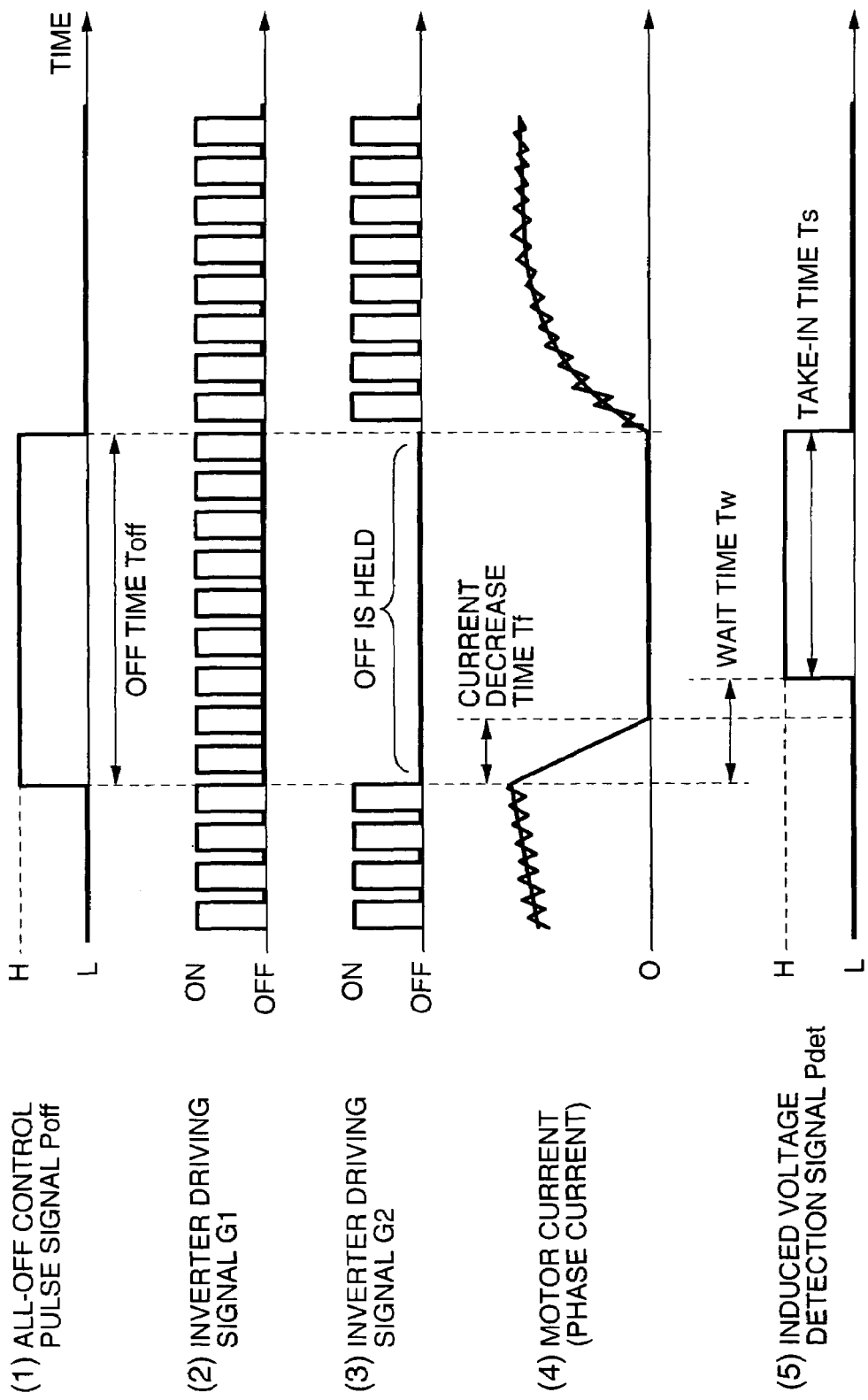

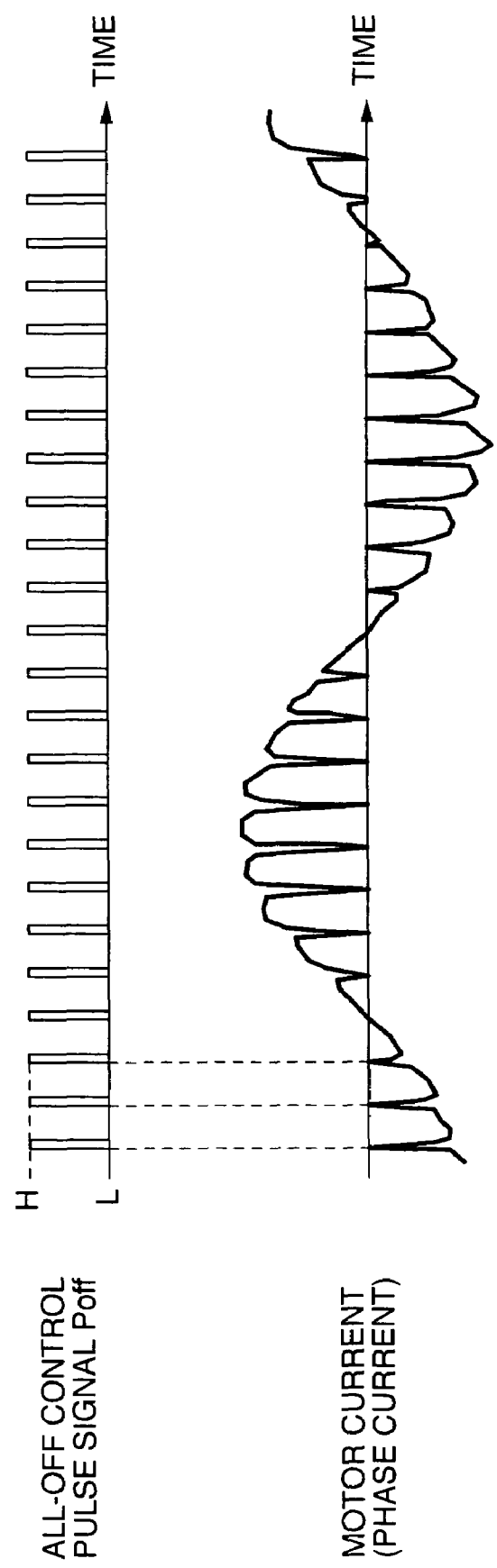

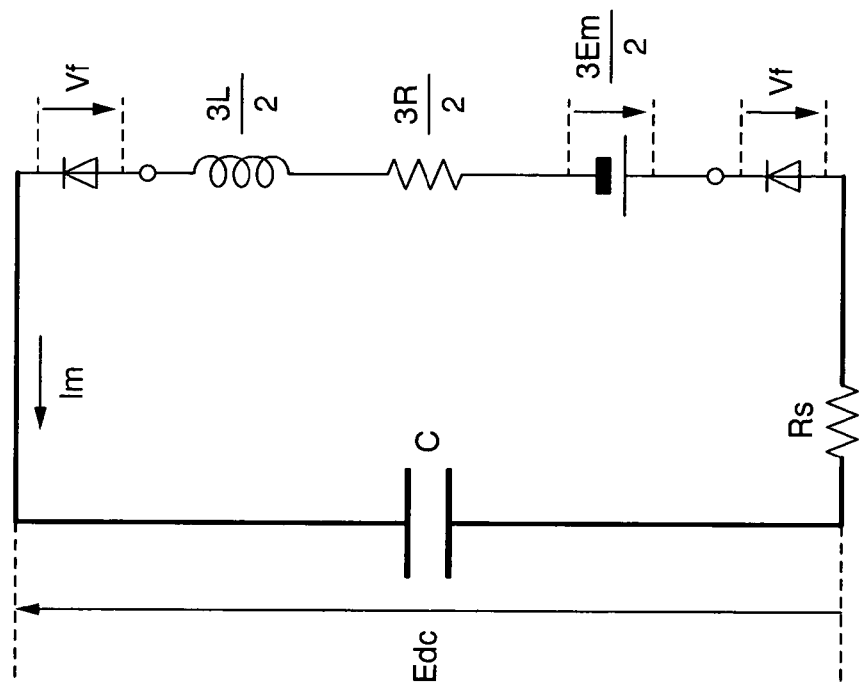
FIG.10A EQUIVALENT CIRCUIT AT TIMING (1)
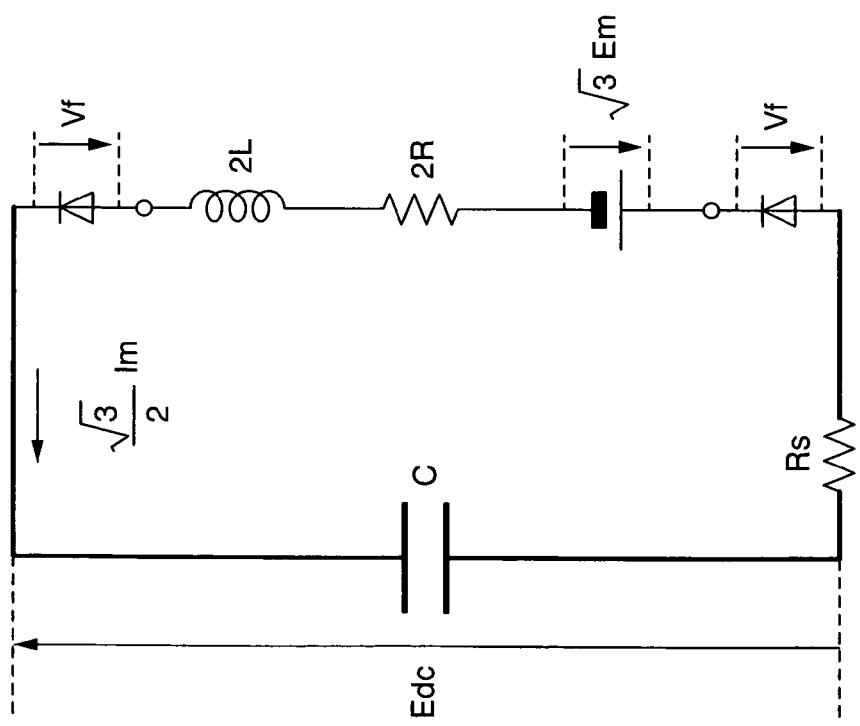
FIG.10B EQUIVALENT CIRCUIT AT TIMING (2)

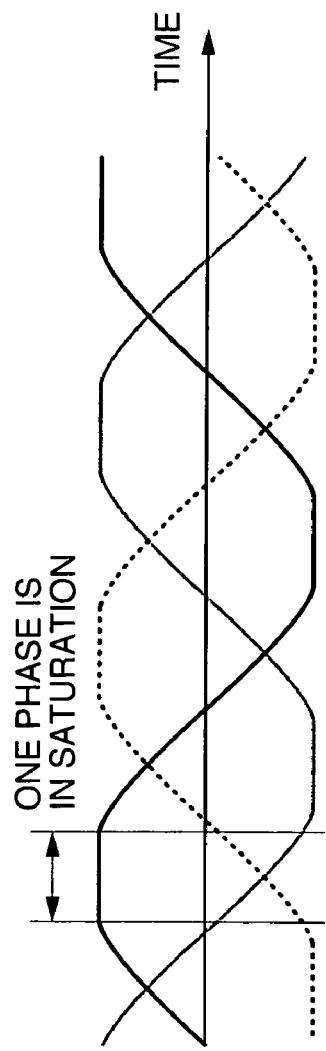
FIG.12A ONE-PHASE SATURATION
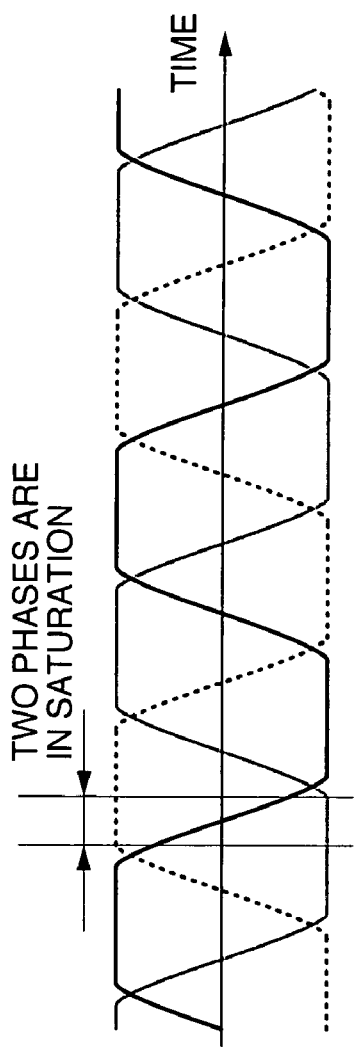
FIG.12B TWO-PHASE SATURATION
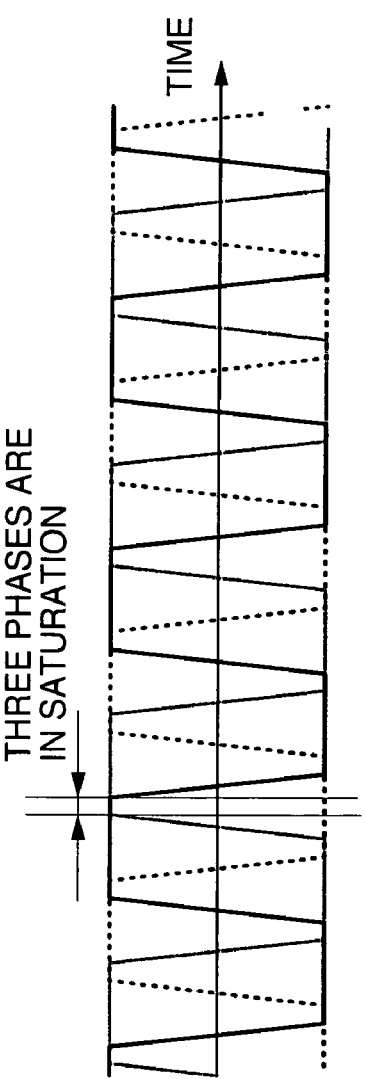
FIG.12C THREE-PHASE SATURATION

SYSTEM AND METHOD FOR DRIVING SYNCHRONOUS MOTOR

BACKGROUND OF THE INVENTION

This invention relates to a control system of a synchronous motor. More particularly, the invention relates to a driving system of a synchronous motor capable of driving a permanent magnet synchronous motor without using a sensor for detecting a rotor position.

Among position sensor-less control technologies for controlling a permanent magnet synchronous motor without using a sensor for detecting a rotor position, a controlling method of a motor by measuring a terminal voltage of the motor and controlling the motor on the basis of this voltage has been primarily used for driving apparatuses of motors having a relatively low voltage. This method will be hereinafter called a "terminal voltage detection system".

Next, the terminal voltage detection system will be explained. Japanese Patent No. 3613063 (paragraphs (0037) to (0051)) describes a terminal voltage detection system in "120-degree power feed driving" as a simple driving method of a synchronous motor. In the case of "120-degree power feed driving", both of upper and lower switching devices are fixed to an OFF state (hereinafter called "power non-feed state") in any one phase of the three-phase inverter. A voltage resulting from speed electromotive force of the motor appears in the terminal voltage of the phase that is under the power non-feed state. Therefore, the voltage of the speed electromotive force of the motor can be detected if the terminal voltage of the phase under the power non-feed state is measured, and a rotor position can be estimated. In this patent document, the commutation timing at which the power feed phase of 120-degree power feed is switched is determined by comparing the terminal voltage measured with a predetermined reference potential.

JP-A-2004-343913 (paragraphs (0030) and (0031)) describes a terminal voltage detection system when the driving method is "180-degree power feed driving". In the case of this "180-degree power feed driving", either one of the upper and lower witching devices of each phase of a three-phase inverter is always turned on (with the proviso that a dead time is secured to turn off the upper and lower two switching devices for a short period to prevent the short-circuit) at the upper and lower devices.

Therefore, the terminal voltage of the motor is fixed to the potential of the inverter output and the speed electromotive force of the motor cannot be detected. The method of this second patent document temporally switches the driving method to 120-degree power feed driving for the phase in which the motor current is approximate to zero. As a result, because both upper and lower switching devices are temporally fixed to OFF in the phase that is switched to 120-degree power feed driving, the voltage of the speed electromotive force can be detected from the terminal voltage and the rotor position can be determined.

JP-A-2002-95283 (paragraph (0021) and FIG. 1) describes a technology for determining a rotor position by comparing a terminal voltage with terminal data waveform data that is in advance stored. In the methods disclosed in Japanese Patent No. 3613063 and JP-A-2004-343913 described above, the terminal voltage measured is compared with the predetermined reference potential and there is the timing at which the two potentials are equal to each other. When they become equal to each other, the rotor position is found as having a specific value at that point. According to these methods, however, the point of intersection between the terminal voltage and the reference potential must exist during the power non-feed period (under the power non-feed state described above) and the driving condition to which the methods can be applied is limited. Therefore, in JP-A-2002-95283 the terminal voltage measured is compared with the terminal voltage waveform data and estimates the rotor position by examining to which phase the present phase corresponds. In this way, an arbitrary rotor position can be determined.

SUMMARY OF THE INVENTION

The position sensor-less control technology of the permanent magnet synchronous motor described in the first to third patent documents cited above (Japanese Patent No. 3613063, JP-A-2004-343913 and JP-A-2002-95283) selects the phase in which the motor current is zero or one phase in which the motor current is approximate to zero, and observes the terminal voltage by bringing that phase into the power non-feed state. Therefore, the number of times of observations of the terminal voltage of the motor becomes 6 during one turn of an electrical angle phase in the case of a three-phase AC motor. Consequently, the lower the rotating speed of the motor, the longer becomes the observation cycle of the terminal voltage, that is, the observation time interval. As the cycle for acquiring the information of the rotor position gets thus elongated and an abrupt load torque change cannot be detected with the result of the stop of the motor.

In the position sensor-less control technology of the permanent magnet synchronous motor described in the patent documents cited above (Japanese Patent No. 3613063, JP-A-2004-343913 and JP-A-2002-95283), the motor current is zero in the phase in which the terminal voltage is observed but the motor current flows in other phases. Therefore, the induced voltage owing to the motor currents of the other phases appears in the terminal voltage. When the induced voltage becomes greater than the induced voltage, an error occurs in the calculation of the rotor position.

In the position sensor-less control technology of the permanent magnet synchronous motor described in the patent document JP-A-2002-95283 cited above, the terminal voltage waveform data is prepared in advance in accordance with the speed information of the motor and is compared with the observation value of the terminal voltage. This system cannot determine the correct rotor position unless the speed information when generating the terminal waveform data is correct. Therefore, the problems that the correct rotor position cannot be determined and the motor stops operating exist in the motor driving system in which the speed drastically changes.

It is an object of the invention to provide a driving system of a permanent magnet synchronous motor that reduces an observation cycle of a terminal voltage of the motor and can withstand abrupt load fluctuation.

A motor driving apparatus according to the invention reduces an observation cycle of a terminal voltage when a rotor position is estimated from the terminal voltage of the motor and improves load follow-up performance during low speed rotation.

A position sensor-less driving apparatus of a permanent magnet synchronous motor according to the invention can follow up a large load torque change during low speed rotation.

Other objects, features and advantages of the invention will become apparent from the following description of the embodiments of the invention taken in conjunction with the accompanying drawings.

BRIEF DESCRIPTION OF THE DRAWINGS

FIG. 2 is a time chart showing the relation of control signals in Embodiment 1 of the invention;

FIG. 3 is an explanatory view of a motor current waveform in Embodiment 1 of the invention;

FIGS. 10A and 10B are explanatory views of the equivalent circuits of the free wheel mode in Embodiment 1 of the invention;

FIGS. 12A, 12B and 12C are explanatory views of an induced voltage signal due to output saturation of a terminal voltage amplifier 6 in Embodiment 1.

DESCRIPTION OF THE EMBODIMENTS

Figure 1:
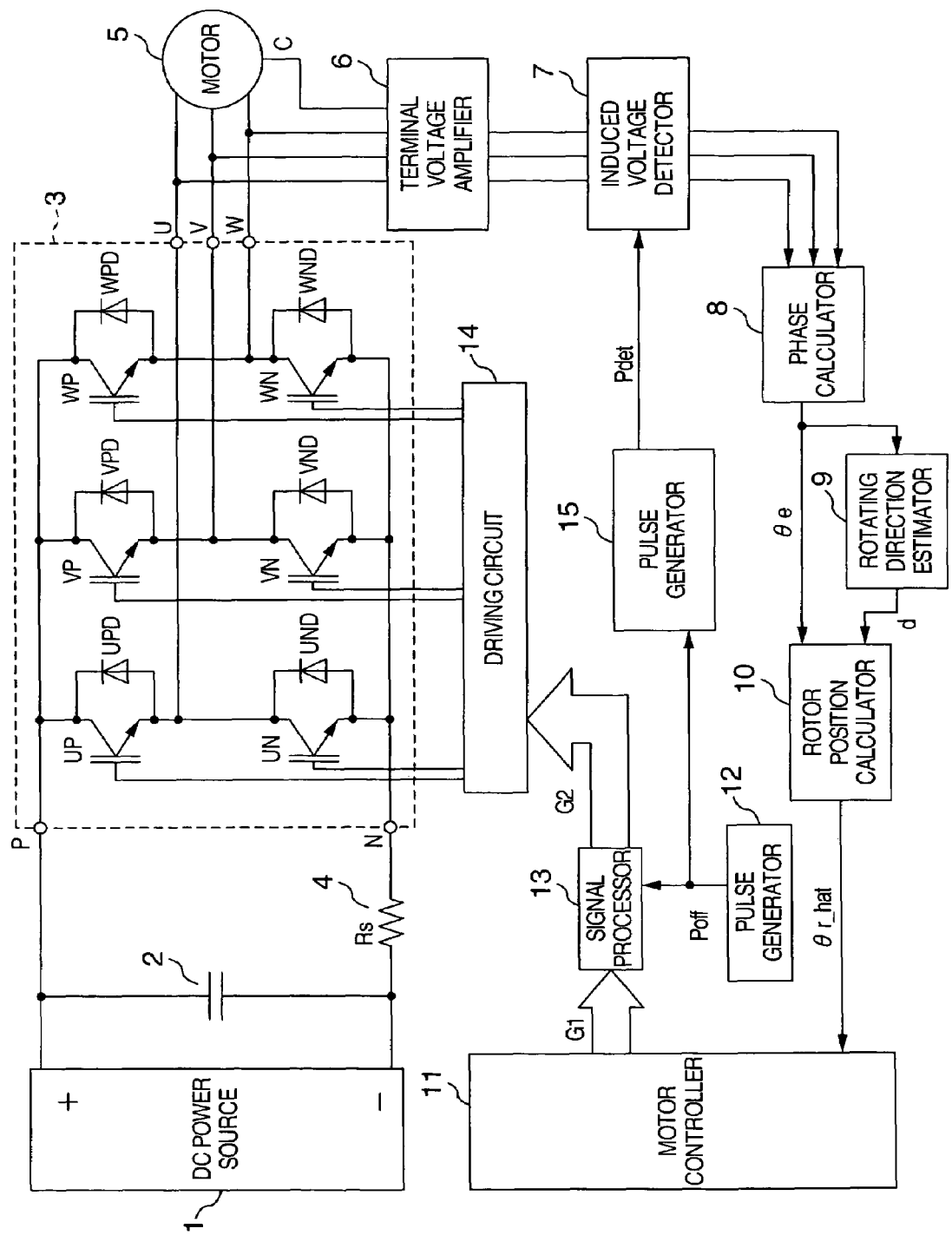
FIG. 1 is an overall control block diagram of a position sensor-less driving system of a permanent magnet synchronous motor according to Embodiment 1 of the invention.

To shorten the cycle for observing a terminal voltage of a motor, the inventor of the present invention has examined afresh a system for measuring a terminal voltage under the state where power is not fed in all phases by turning off all switching devices of a three-phase inverter at an arbitrary timing.

However, the motor current does not immediately return to zero even when all the switching devices are turned off and there is the case where an induced voltage owing to the motor current is contained in the terminal voltage.

Therefore, the inventor of this application has clarified the operation of the motor current when all the switching devices are turned off. When all the switching devices are turned off, the motor current changes to the state where it flows through a free wheel diode (hereinafter called a "free wheel mode"). The inventor of this application has found that the behaviors of the motor current in the free wheel mode or more concretely, the gradient of the decrease of the motor current and the time till the motor current drops to zero, are determined depending on the electrical constants of the motor (resistance, inductance, back electromotive force or back EMF), motor current, rotating speed (speed electromotive force), DC voltage Edc and voltage drop Vf of the free wheel diode. Furthermore, the inventor has clarified through calculation by applying this concept to a specific motor driving system that the time from turn-OFF of all the switching devices to the drop of the motor current to zero is about 100 μs and is sufficiently smaller than one cycle time of the AC voltage outputted by the inverter.

The inventor of the application has further clarified that the motor current has dropped to zero and a voltage of a correct speed electromotive force can be acquired by turning OFF all the switching elements of the three-phase inverter at an arbitrary timing and measuring the terminal voltage after the passage of a predetermined wait time. The current decrease time from turn-OFF of all the switching devices to the drop of the current to zero can be estimated if the electrical constants of the motor, the DC voltage, the rotating speed and the motor current are determined. Therefore, the wait time described above is decided by calculating in advance the current decrease time in all the change ranges of the rotating speed and the motor current.

After all the switching devices of the three-phase inverter are turned off, the current flowing in the free wheel mode passes through a DC bus line connecting the inverter and the DC power source. Therefore, the time in which the motor current flowing in the DC power source decreases and then reaches zero can be detected by measuring a voltage across both ends of a shunt resistor connected between the inverter and the DC power source. When the terminal voltages of at least two phases are determined during the measurement of the terminal voltage, the phase can be calculated by using an arc tangent function. The phase of the induced voltage changes 180° when the rotating direction inverses. Consequently, the inversion of the rotating direction can be known when a change width exceeds a predetermined width by calculating in advance the change of the phase of the induced voltage. To estimate the rotating direction from the stop state, whether or not the rotating direction is normal or reverse can be distinguished depending on whether or not the phase of the induced voltage increases or decreases. Because amplitude information of the induced voltage created by speed electromotive force can be acquired, the back electromotive force of the permanent magnet synchronous motor can be determined. Furthermore, the temperature of the permanent magnet portion of the motor can be estimated from the change component of the back electromotive force of the permanent magnet synchronous motor.

Embodiments of the invention will be hereinafter explained in detail with reference to the accompanying drawings.

Embodiment 1

FIG. 1 shows a structural view of this embodiment. A capacitor 2 for smoothing a DC voltage is connected between a positive terminal and a negative terminal of a DC power source 1. The positive terminal of the capacitor 2 is connected with a DC positive terminal P of inverter 3. A DC negative terminal N of an inverter 3 is connected to the negative terminal of the capacitor 2 through a shunt resistor 4. AC terminals U, V and W of a synchronous motor 5 such as a permanent magnet synchronous motor as a control object are connected to AC output terminals of the inverter 3. The synchronous motor 5 is driven by three-phase AC power supplied by the inverter 3.

A terminal voltage amplifier 6 is connected to the AC terminals (U, V, W) of the synchronous motor 5 and to a neutral terminal C of a stator winding. The terminal voltage amplifier 6 multiplies the voltage between the AC terminal (U, V, W) and the neutral terminal C by a predetermined gain and outputs the product as a terminal voltage signal. An induced voltage detector 7 takes in the voltage value of the terminal voltage signal at a specific timing in accordance with a later-appearing induced voltage detection signal Pdet and outputs this value as an induced voltage signal. A phase calculator 8 calculates an induced voltage phase θe from the value of the induced voltage signal. A rotating direction estimator 9 estimates the rotating direction of a rotor on the basis of the change of the induced voltage phase θe and outputs a rotating direction estimation signal d. A rotor position calculator 10 inputs the values of the rotating direction estimation signal d and the induced voltage phase θe and calculates and outputs a rotor position estimation value θr_hat.

A motor controller 11 outputs an inverter driving signal G1 on the basis of the rotor position estimation value θr_hat. A pulse generator 12 outputs an all-OFF control pulse signal Poff. A signal processor 13 processes the inverter driving signal G1 in accordance with the value of the all-OFF control pulse signal Poff and outputs an inverter driving signal G2. The inverter driving signal G2 is connected to a driving circuit 14. The output of the driving circuit 14 is connected to control terminals of power semiconductor switching devices UP, UN, VP, VN, WP and WN such as IGBT or power MOSFETs constituting the inverter 3. The all-OFF control pulse signal Poff is connected to a pulse generator 15. The pulse generator 15 outputs an induced voltage detection signal Pdet.

Next, the operation of this embodiment will be explained. To begin with, the operations of the signal processor 13 and the pulse generator 15 will be explained. FIG. 2 is a time chart showing the relation between each signal and the motor current. The inverter driving signal G2 is changed in accordance with the all-OFF control pulse signal Poff of (1) in FIG. 2. When the all-OFF control pulse signal Poff is at an L (low) level, the same signal as the inverter driving signal G1 is outputted as the inverter driving signal G2. When the all-OFF control pulse signal Poff is at an H (high) level, all the power semiconductor switch elements are turned off by fixing the inverter driving signal G2 at an OFF level. Incidentally, FIG. 2 shows only one of the pulse signals contained in the inverter driving signals G1 and G2 for the sake of convenience of illustration in the drawing. The inverter driving signals G1 and G2 are the signals for driving the power semiconductor switch elements UP, UN, VP, VN, WP and WN constituting the inverter 3 as described above and have six pulse signals. The inverter driving signal G1 is a three-phase sine wave pulse width modulation signal for 180-degree power feed driving.

When the power semiconductor switching devices of the inverter 3 are driven by the inverter driving signal G2, the motor current changes as shown in (4) of FIG. 2. First, when the all-OFF control pulse signal Poff is at the L level, the output of the inverter 3 is the voltage subjected to the three-phase sine wave pulse width modulation and the motor current flows. Here, when the all-OFF control pulse signal Poff changes to the H level, the all the power semiconductor switching devices of the inverter are turned off. In consequence, the motor current decreases and reaches zero after the passage of a predetermined time.

FIG. 3 shows an example of the motor current waveform when the operation is made in this embodiment. Here, the all-OFF control pulse signal Poff is set to the H level in a predetermined cycle. When the all-OFF control pulse signal Poff changes to the H level, all the power semiconductor switching devices of the inverter 3 are turned off and the motor current temporally drops to zero. When driving is made by the voltage subjected to the three-phase sine wave pulse width modulation, the motor current should originally flows in the sine wave form but when driving is made by the present embodiment, the current waveform becomes the an AC current waveform having slits in a comb shape as shown in FIG. 3.

Incidentally, the motor output torque does not take a constant value in the motor current waveform shown in FIG. 3. For, when the motor current becomes zero, the motor output torque becomes zero, too. Therefore, the motor output torque vibrates in the same frequency as the frequency that brings the all-OFF control pulse signal Poff to the H level. When this embodiment is practically applied, the frequency that brings the all-OFF control pulse signal Poff to the H level may well be determined by taking into account the influences exerted by the torque vibration on the motor driving system. The frequency that brings the all-OFF control pulse signal Poff to the H level may be set to a value within the range of 5 to 50 times the upper limit of the motor driving frequency, preferably from 10 to 20 times, for example.

FIG. 2-(5) shows the change of the induced voltage detection signal Pdet. The induced voltage detection signal Pdet is the signal that changes to the H level with the delay of a wait time Tw after the all-OFF control pulse signal Poff changes to the H level. The wait time TW is set to a time longer than the time Tf in which the motor current changes to zero. The method of deciding the wait time will be described later in detail.

In the explanation that follows, the time Toff in which all the power semiconductor switching devices are fixed at OFF is the sum of the wait time Tw and a take-in time Ts. The term "take-in time Ts" means the time necessary for taking in the induced voltage and changes depending on the concrete constructions of the induced voltage detector 7 and the phase calculator 8. A concrete example of the take-in time Ts is a sample time of an A/D converter when the A/D converter is used for taking in the induced voltage.

Figure 4B:
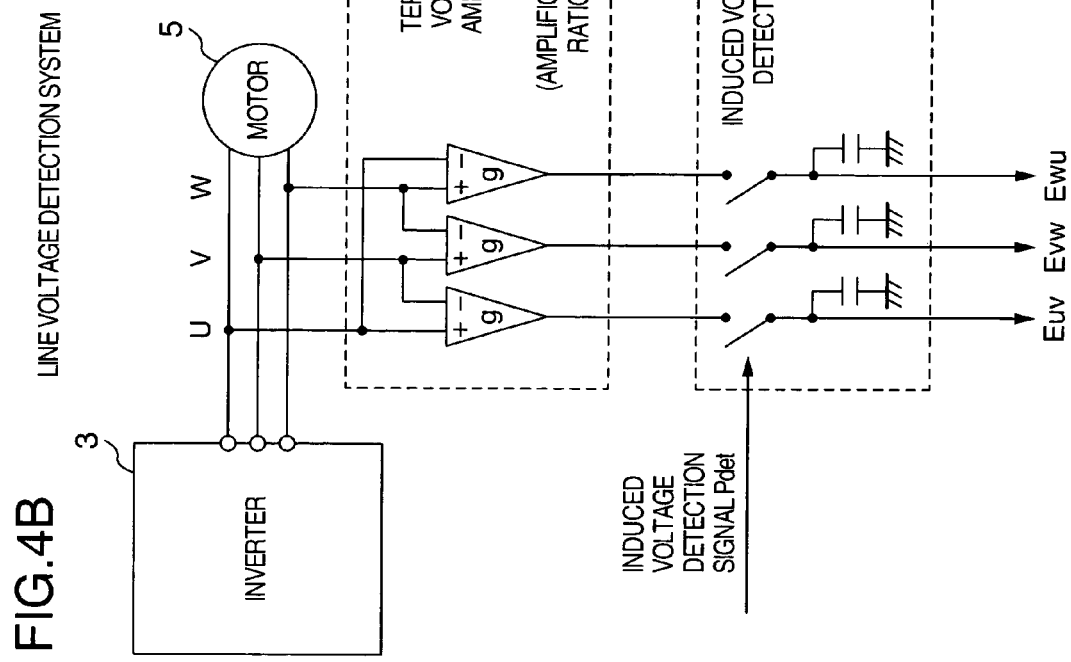
FIGS. 4A and 4B are explanatory views of a terminal voltage amplifier and an induced voltage detector in Embodiment 1 of the invention.
Figure 4A:
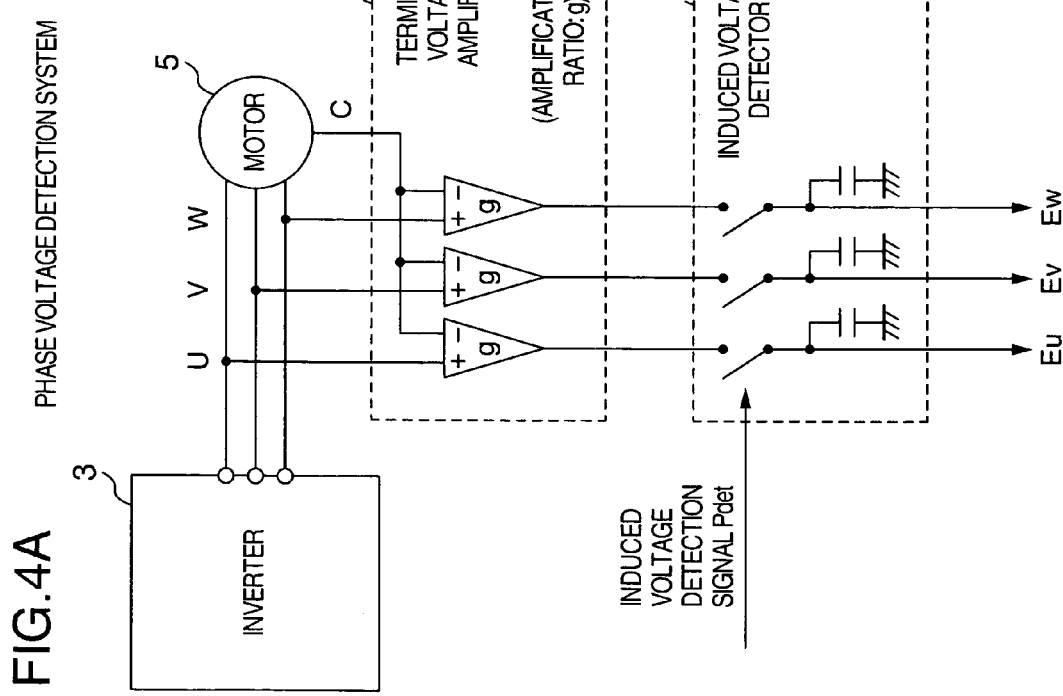

FIGS. 4A and 4B show structural examples of the terminal voltage amplifier 6 and the induced voltage detector 7. FIGS. 4A and 4B show two examples. FIG. 4A shows a phase voltage detection system and FIG. 4B shows a line voltage detection system. The terminal voltage amplifier 6 is constituted by three differential input type amplifiers. Incidentally, the amplification ratio of the amplifier is g times in FIGS. 4A and 4B. In the case of the line voltage detection system shown in FIG. 4B, a neutral terminal C of a stator winding is not necessary.

The induced voltage detector 7 detects the terminal voltage signal outputted by the terminal voltage amplifier 6 when the level of the induced voltage detection signal Pdet is the H level. FIGS. 4A and 4B show an example using a sample-and-hold circuit as an example of the induced voltage detector 7. The switch elements of the sample-and-hold circuit are generally turned on when the induced voltage detection signal Pdet is at the L level and are switched to OFF when the induced voltage detection signal Pdet changes to the H level, so that the potential of the terminal voltage signal at that time is held in a capacitor. Because the motor current is zero when the induced voltage detection signal Pdet is at the H level, the terminal voltage signal held is the one obtained by multiplying by g the induced voltage resulting from the speed electromotive force.

The phase calculator 8 shown in FIG. 1 calculates the induced voltage phase θe from the induced voltage signal outputted by the induced voltage detector 7. When the terminal voltage amplifier 6 employs the phase voltage detection system shown in FIG. 4A, the induced voltage signals are the phase induced voltages Eu, Ev and Ew. The values of these Eu, Ev and Ew are expressed by the following equation (1). Here, ωm represents an angular velocity of rotation and g is the amplification factor of the amplifier. Symbol $K_E$ is a back electromotive force and is a parameter representing the relation between an angular velocity of rotation of the synchronous motor and magnitude of the speed electromotive force. In the case of the phase voltage detection system, the induced voltage phase θe is decided from equations (2) and (3).

$$\begin{cases} Eu = -g \cdot K_E \omega_m \cdot \sin(\theta_d) \\ Ev = -g \cdot K_E \omega_m \cdot \sin\left(\theta_d - \frac{2}{3}\pi\right) \\ Ew = -g \cdot K_E \omega_m \cdot \sin\left(\theta_d - \frac{4}{3}\pi\right) \end{cases} \quad (1)$$

$$\begin{cases} \alpha = \frac{2}{3}\left(Eu - \frac{Ev}{2} - \frac{Ew}{2}\right) \\ \beta = \frac{1}{\sqrt{3}}(Ev - Ew) \end{cases} \quad (2)$$

$$\theta e = \tan^{-1}(\beta/\alpha) - \frac{\pi}{2} \quad (3)$$

When the terminal voltage amplifier 6 employs the line voltage detection system, the induced voltage signals are the line induced voltages Euv, Evw and Ewu. The values of these Euv, Evw and Ewu are expressed by equation (4). In the case of the line voltage detection system, the induced voltage phase θe is determined by equations (5) and (6).

$$\begin{cases} Euv = Eu - Ev = -\sqrt{3} \cdot g \cdot K_E \omega_m \cdot \sin\left(\theta_d + \frac{1}{6}\pi\right) \\ Evw = Ev - Ew = -\sqrt{3} \cdot g \cdot K_E \omega_m \cdot \sin\left(\theta_d + \frac{1}{6}\pi - \frac{2}{3}\pi\right) \\ Ewu = Ew - Eu = -\sqrt{3} \cdot g \cdot K_E \omega_m \cdot \sin\left(\theta_d + \frac{1}{6}\pi - \frac{4}{3}\pi\right) \end{cases} \quad (4)$$

$$\begin{cases} \alpha = \frac{2}{3}\left(Euv - \frac{Evw}{2} - \frac{Ewu}{2}\right) \\ \beta = \frac{1}{\sqrt{3}}(Evw - Ewu) \end{cases} \quad (5)$$

$$\theta e = \tan^{-1}(\beta/\alpha) - \frac{\pi}{2} - \frac{\pi}{6} \quad (6)$$

Equation (3) and equation (6) have a phase difference of 30 degrees to have the values of the induced voltage phases θe outputted from the phase calculator 8 equal to each other because the voltage detection method includes two methods, that is, a phase voltage detection method and a line voltage detection method as shown in FIGS. 4A and 4B. Incidentally, the arc tangent function in equations (3) and (6) is a function for determining the angle of a straight line connecting the X axis and a point (α, β) from the origin on the X-Y coordinates. Therefore, the phase angle can be calculated even when α=0.

In this embodiment, all the power semiconductor switching devices are changed to OFF and the terminal voltage signal is taken in. Because the motor currents of all the phases are zero at this time, it is possible to acquire the induced voltage signals Eu, EV and Ew (or Euv, Evw and Ewu) of all the three phases. As a result, the phase of the induced voltage can be determined by using the value of the terminal voltage alone as can be understood from equations (2) and (3) or equations (5) or (6). Because this embodiment does not use the speed information of the motor under driving for the estimation of the phase, the phase can be correctly calculated when the speed abruptly changes, too.

The rotor position calculator 10 shown in FIG. 1 calculates the rotor position estimation value θr_hat in accordance with equation (7). As can be understood from equation (7), the phase is inverted by 180 degrees when a rotating direction estimation signal d is reverse rotation.

$$\begin{cases} \theta r\_hat = \theta e & \cdots \text{ when } d = \text{normal rotation} \\ \theta r\_hat = \theta e - \pi & \cdots \text{ when } d = \text{reverse rotation} \end{cases} \quad (7)$$

The rotating direction estimator 9 shown in FIG. 1 estimates the rotating direction of the rotor on the basis of the change of the induced voltage phase θe. This estimation first calculates this-time-value of the rotor position estimation value θr_hat and determines an absolute value δ of the phase change amount from the difference between this time value of θr_hat and the previous time value. Next, when the absolute value δ of the phase change amount calculated exceeds a judgment value, the rotating direction is judged as reversing and the value of the rotating direction estimation signal d is replaced. More concretely, when the rotating direction estimation signal d indicates the normal rotation, the rotation is changed to the reverse rotation and when the rotating direction estimation signal d indicates the reverse rotation, the rotation is changed to the normal direction. Generally speaking, the phase of the speed electromotive force of the permanent magnet synchronous motor changes by 180 degrees when the rotating direction changes. Therefore, the inversion of the rotating direction can be detected when the absolute value δ of the phase change amount described above is approximate to 180 degrees.

Figure 5:
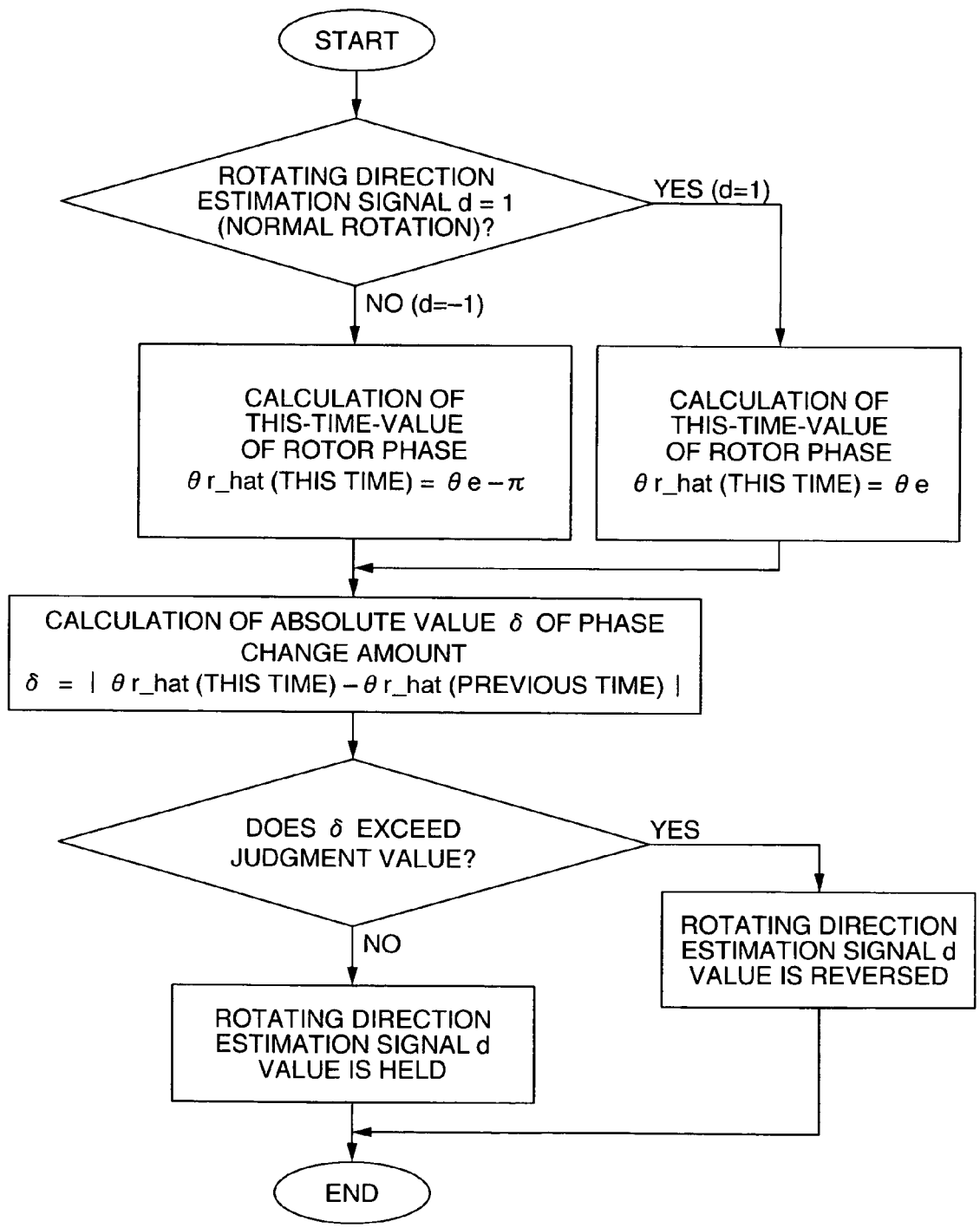
FIG. 5 is a flowchart of an algorithm of rotating direction estimation in Embodiment 1 of the invention.

Incidentally, the estimation algorithm shown in FIG. 5 cannot be applied when the rotation first takes place from the stop state. In this case, the rotating direction can be judged by observing the change of the induced voltage phase θe after the induced voltage is detected from the stop state. In other words, the rotating direction estimation signal d is judged as the normal rotation when the induced voltage phase θe increases and is judged as the reverse rotation when the induced voltage phase θe decreases.

Next, the decrease of the motor current when all the power semiconductor switching devices are turned off will be explained. All the power semiconductor switching devices of the inverter 3 are turned off when the all-OFF control pulse Poff changes to the H level as has already been explained with reference to FIG. 2 and the motor current decreases. At this time, the motor current flows through a line passing through any of the free wheel diodes UPD, UND, VPD, VND, WPD and WND that constitute the inverter 3 in FIG. 1. The operating mode in which the motor current decreases through the free wheel diodes will be hereinafter called "free wheel mode".

Figure 6:
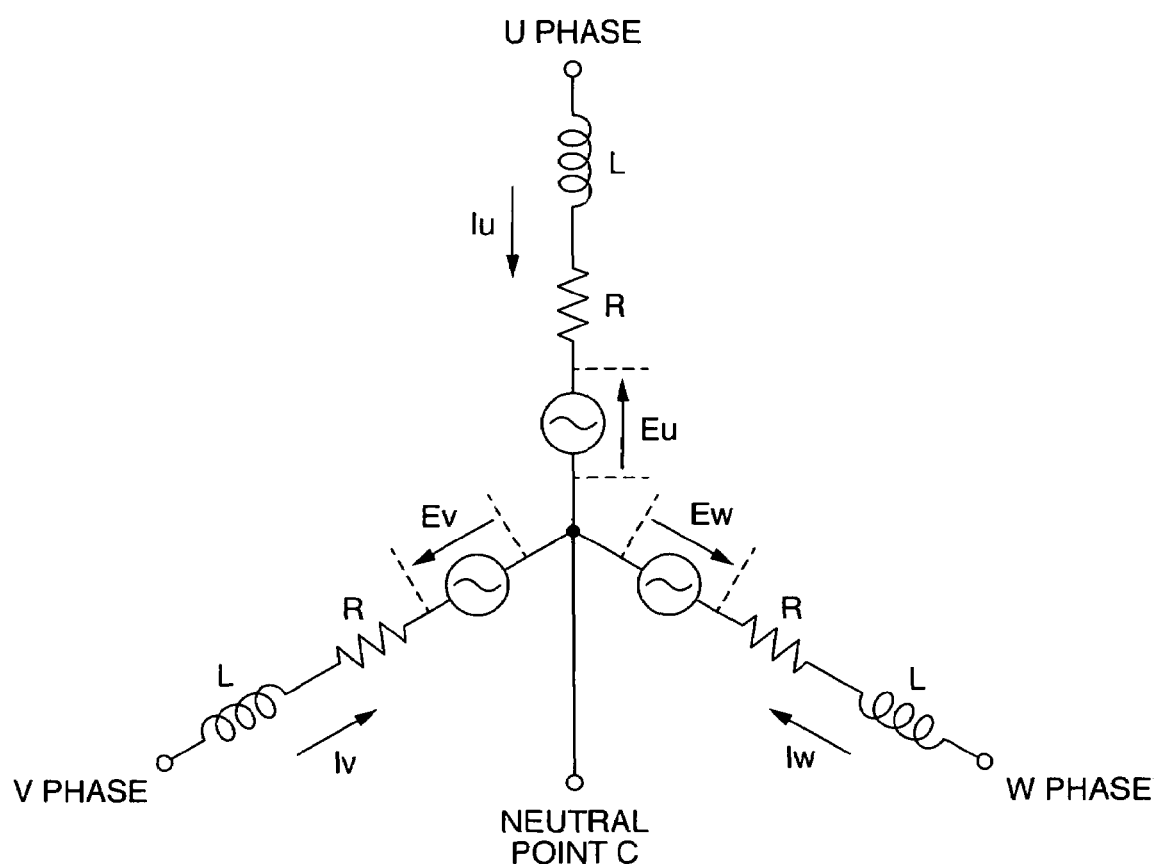
FIG. 6 is an equivalent circuit of a permanent magnet synchronous motor.
Figure 7:
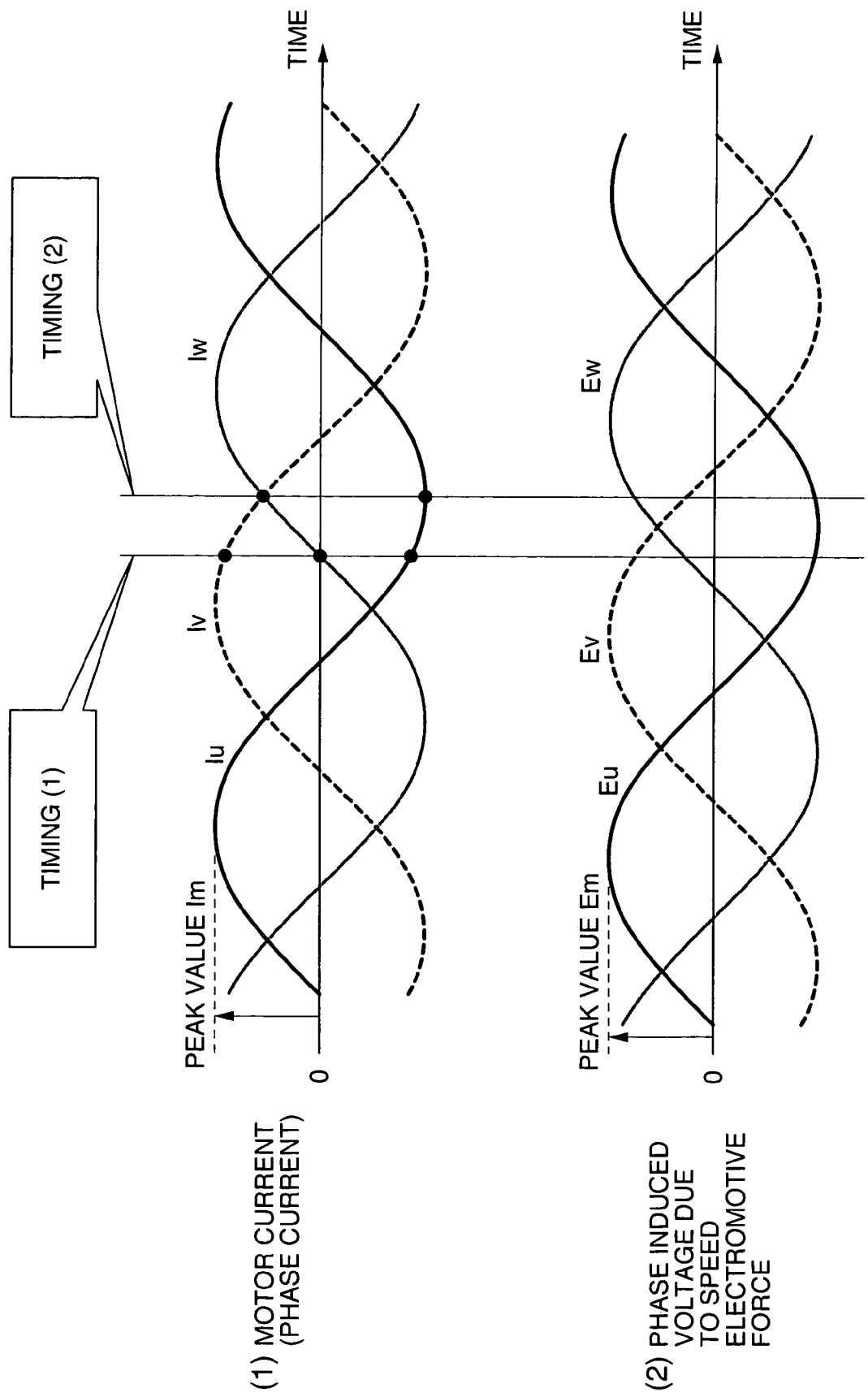
FIG. 7 shows waveform diagrams for explaining peak values of motor current and induced voltage in Embodiment 1.

The circuit operation has been clarified to correctly grasp the current decrease time Tf in the free wheel mode. FIG. 6 shows an equivalent circuit of the synchronous motor. In FIG. 6, the synchronous motor is constituted by voltage sources Eu, Ev and Ew, a resistor R and an inductance L. It will be assumed hereby that a motor current having a peak value Im shown in FIG. 7 flows through this motor. Two timings, i.e. timing (1) and timing (2), shown in FIG. 7 are selected for the purpose of analysis and the operation mode changes to the free wheel mode at these timings, respectively.

Figure 8:
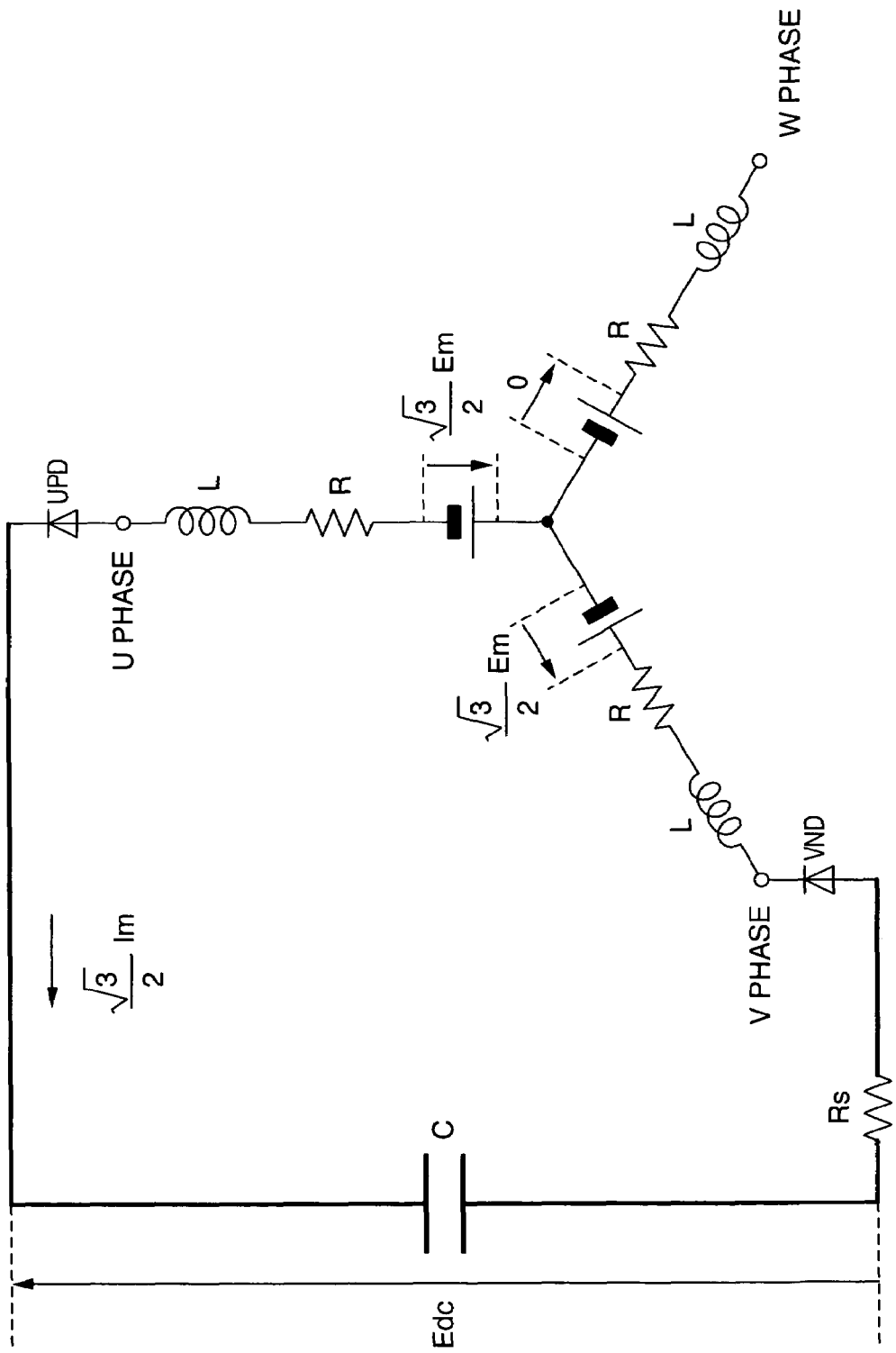
FIG. 8 is an explanatory view of an equivalent circuit of an inverter and a motor at a timing (1) of a free wheel mode in Embodiment 1 of the invention.
Figure 9:
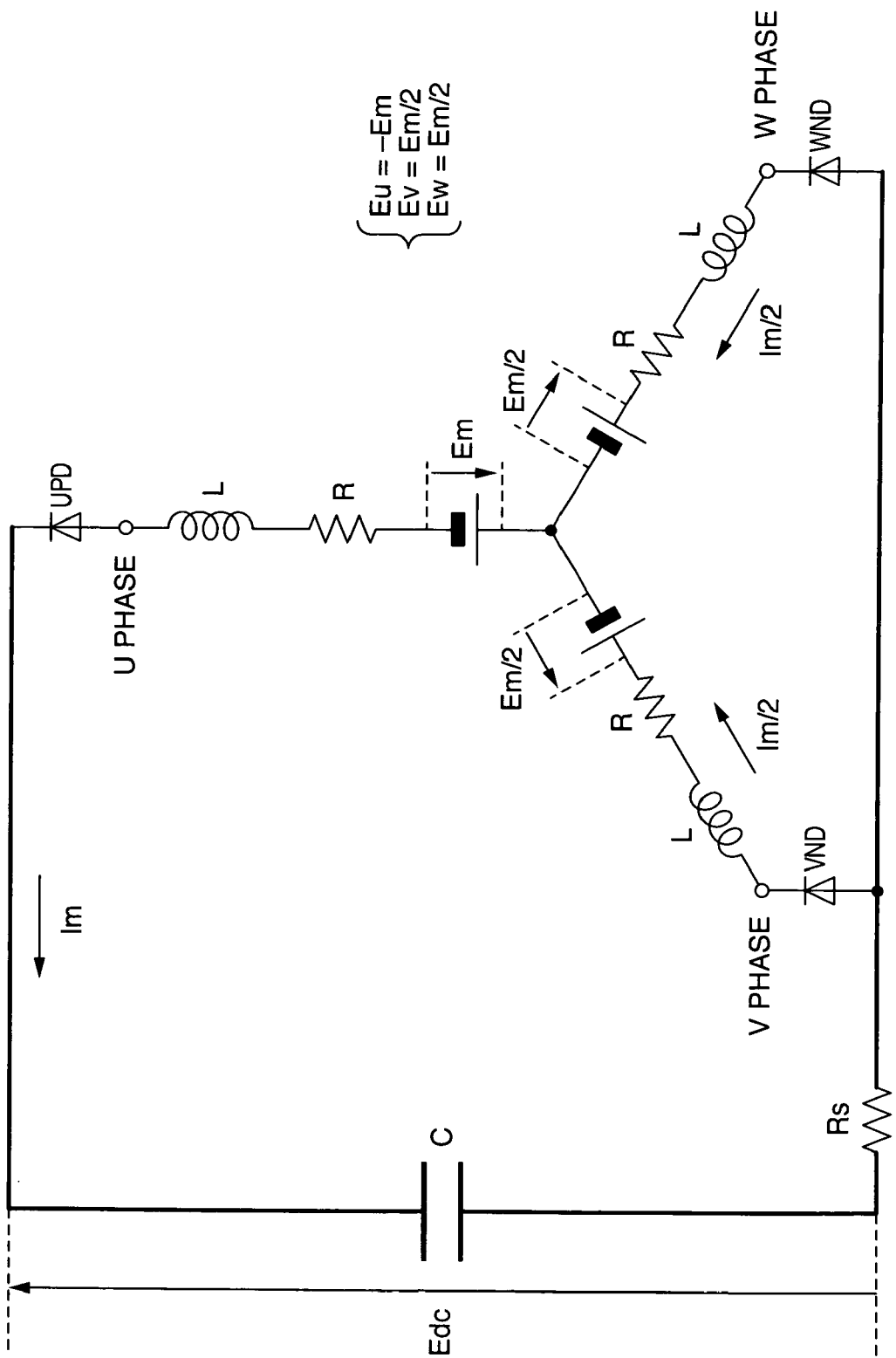
FIG. 9 is an explanatory view of the equivalent circuit of the inverter and the motor at a timing (2) of the free wheel mode in Embodiment 1 of the invention.

FIG. 8 shows a circuit of the free wheel mode at the timing (1). Similarly, FIG. 9 shows a circuit of the free wheel mode at the timing (2). Incidentally, the current in each of FIGS. 8 and 9 is set from the current value at each of these timings. Each phase current value at the timing (1) is given by the following equation when the peak value of the current is Im.

$$\begin{cases} Iu = -\dfrac{\sqrt{3}}{2} Im \\ Iv = \dfrac{\sqrt{3}}{2} Im \\ Iw = 0 \end{cases} \quad (8\text{-}1)$$

Similarly, each phase current value at the timing (2) is given by:

$$\begin{cases} Iu = -Im \\ Iv = \dfrac{Im}{2} \\ Iw = \dfrac{Im}{2} \end{cases} \quad (8\text{-}2)$$

In FIGS. 8 and 9, symbol Edc represents a DC potential of the capacitor 2. Equivalent circuits shown in FIGS. 10A and 10B can be obtained when a combined circuit is considered for the circuits shown in FIGS. 8 and 9. Here, symbol Vf represents a forward direction drop voltage of the free wheel diode. The direction of the voltage created by the power source in each equivalent circuit is the direction that decreases the flowing current as can be understood from FIGS. 10A and 10B. An analytical solution of the current can be obtained by establishing a differential equation from the equivalent circuits shown in FIGS. 10A and 10B and solving this differential equation. The analytical solution is expressed by equation (9) where Etotal is the total of the voltage sources in the equivalent circuit, Rtotal is the total of the resistors and Ltotal is the total of the combined inductance.

$$i(t) = i(0) + \left(-\dfrac{E_{total}}{R_{total}} - i(0)\right)\left(1 - \exp\left(-\dfrac{E_{total}}{R_{total}} t\right)\right) \quad (9)$$

Figure 11:
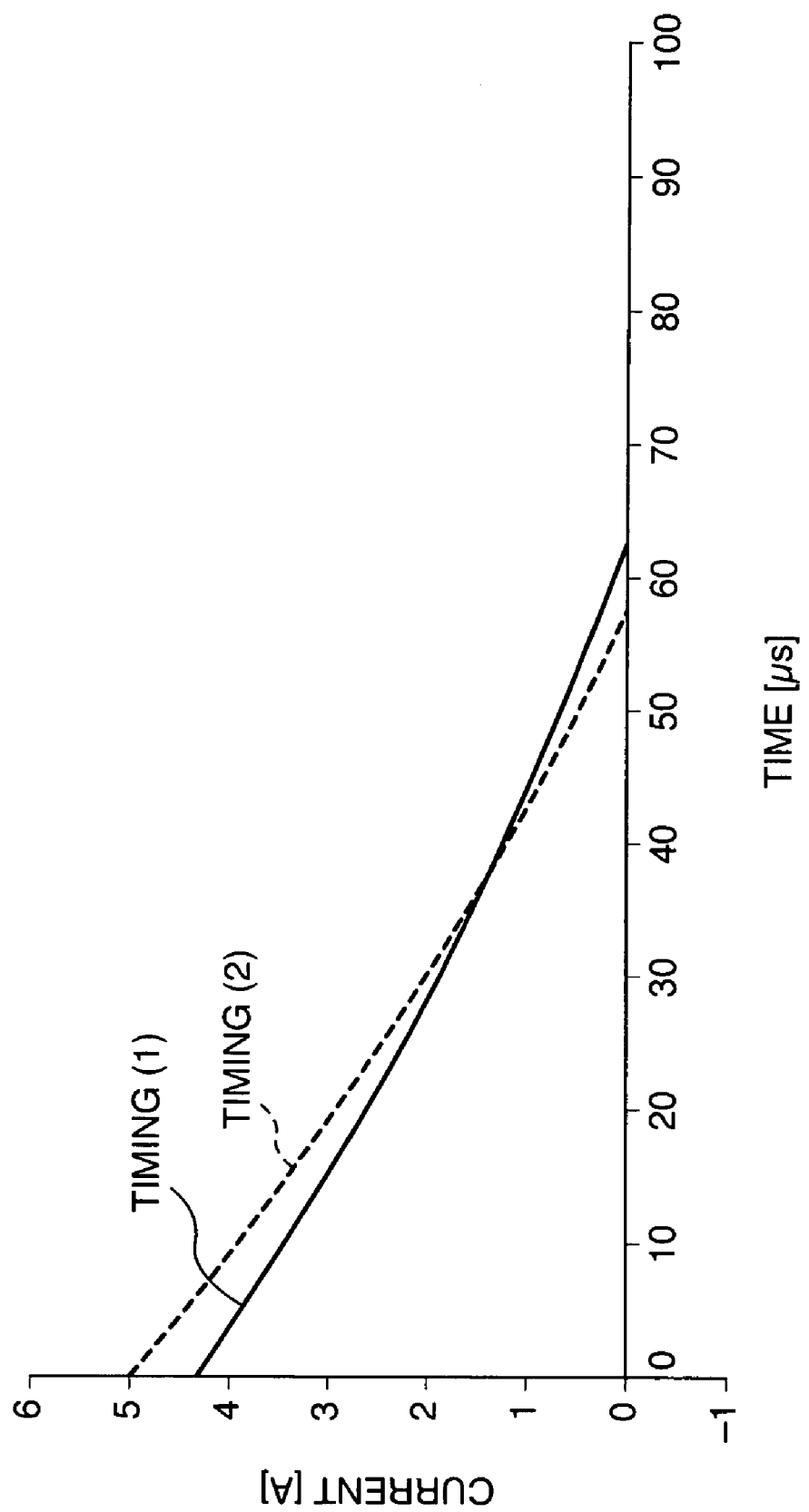
FIG. 11 is an explanatory view of a current change in the free wheel mode determined by simulation calculation.

FIG. 11 shows a simulation result of the current change in the free wheel mode by using the equation (9) and parameters of a practical motor driving apparatus. In FIG. 2, the calculation is made on the assumption of the DC potential of the capacitor Edc=5.0 V, the forward direction drop voltage of the free wheel diode Vf=0.8 V, the induced voltage Em=2.0 V, the electrical constant of the motor R=1.0 Ω, the electrical constant of the motor L=100 μH and the dc shunt resistor Rs=0. In FIG. 11, the solid line of the graph represents the current change at the timing (1) and the broken line does the current change at the timing (2). It can be understood from FIG. 11 that the current drops to zero after the passage of about 60 μs from the shift to the free wheel mode.

It can be understood from the explanation given above that the current decrease time Tf in the free wheel mode is decided by the electrical constants R and L of the motor, the motor current Im, the induced voltage Em, the dc voltage Edc and the voltage drop Vf of the free wheel diode.

Therefore, the invention estimates in advance the maximum value Tfmax of the current decrease time Tf and decides the wait time Tw till the induced voltage detection signal Pdet changes to the H level by equation (10).

$$TW = Tfmax + Tmargin \quad (10)$$

where T margin is a margin for time setting. When the wait time is decided in the manner described above, the motor terminal voltage measured when the induced voltage detection signal Pdet is in the H level is the terminal voltage under the zero state of the motor current. Because the motor current is zero, the voltage drop owing to the impedance component of the winding and the mutual induced voltage from other phases do not exist and the voltage corresponding to the pure speed electromotive force can be detected.

The output of the terminal voltage amplifier 6 gets into saturation during the high speed rotation. This is because the peak value of the induced voltage of the magnetic motor becomes great in proportion to the rotating speed whereas the amplifier output is limited by the power source voltage of the amplification circuit.

FIGS. 12A, 12B and 12C show examples where the output signal of the terminal amplifier 6 gets into saturation. The saturation can be classified into three types shown in FIGS. 12A, 12B and 12C. Namely, the saturation mode includes one-phase saturation where one phase is in saturation, two-phase saturation where two phases are in saturation and three-phase saturation where all the phases are in saturation. The phase error occurs when the phase is determined from the induced voltage under saturation. Therefore, an appropriate design is necessary so that the gain of the amplification circuit corresponds to the range of the change of the induced voltage peak value.

The three-phase induced voltage of the synchronous motor has the relation Eu+Ev+Ew=0 or the relation Euv+Evw+Ewu=0 from equations (1) and (4). Therefore, when the induced voltage signals for the two phases are determined, the induced voltage signal of the remaining one phase can be estimated. It is therefore possible in principle to determine the phase from the induced voltage signals for the two phases. When the output signal of the terminal voltage amplifier 6 gets into saturation as described above, however, the relations Eu+Ev+Ew=0 and Euv+Evw+Ewu=0 are not established. It is therefore advisable to determine the phase by detecting the induced voltage signals for the three phases.

As explained above, this embodiment makes it possible to arbitrarily set the cycle for measuring the terminal voltage of the motor by turning off all the power semiconductor switching devices. Therefore, the observation cycle for acquiring the rotor position information does not get prolonged. In this way, the sensor-less driving system of the permanent magnet synchronous motor capable of following the change of a large load torque, too, can be accomplished.

According to this embodiment, the terminal voltage is measured under the state where the motor currents of all the phases are zero. Since the terminal voltage does not contain the induced voltage by the current, the correct information of the speed electromotive force can be acquired through the measurement of the terminal voltage. Consequently, the error of the rotor position estimation value becomes smaller and a high precision sensor-less driving system of a permanent magnet synchronous motor can be accomplished.

According to this embodiment, further, the terminal voltages of two or more phases are measured under the state where the motor currents of all the phases are zero and the phase of the induced voltage owing to the speed electromotive force is determined by using the arc tangent function. Therefore, the rotor position can be estimated by using only the measured terminal voltage value without using the speed information during the operation. In consequence, even when the speed greatly changes owing to the application of the load, the error in the rotor position estimation value becomes smaller and a sensor-less driving system of a permanent magnet synchronous motor capable of stably driving can be accomplished.

Embodiment 2

Figure 13:
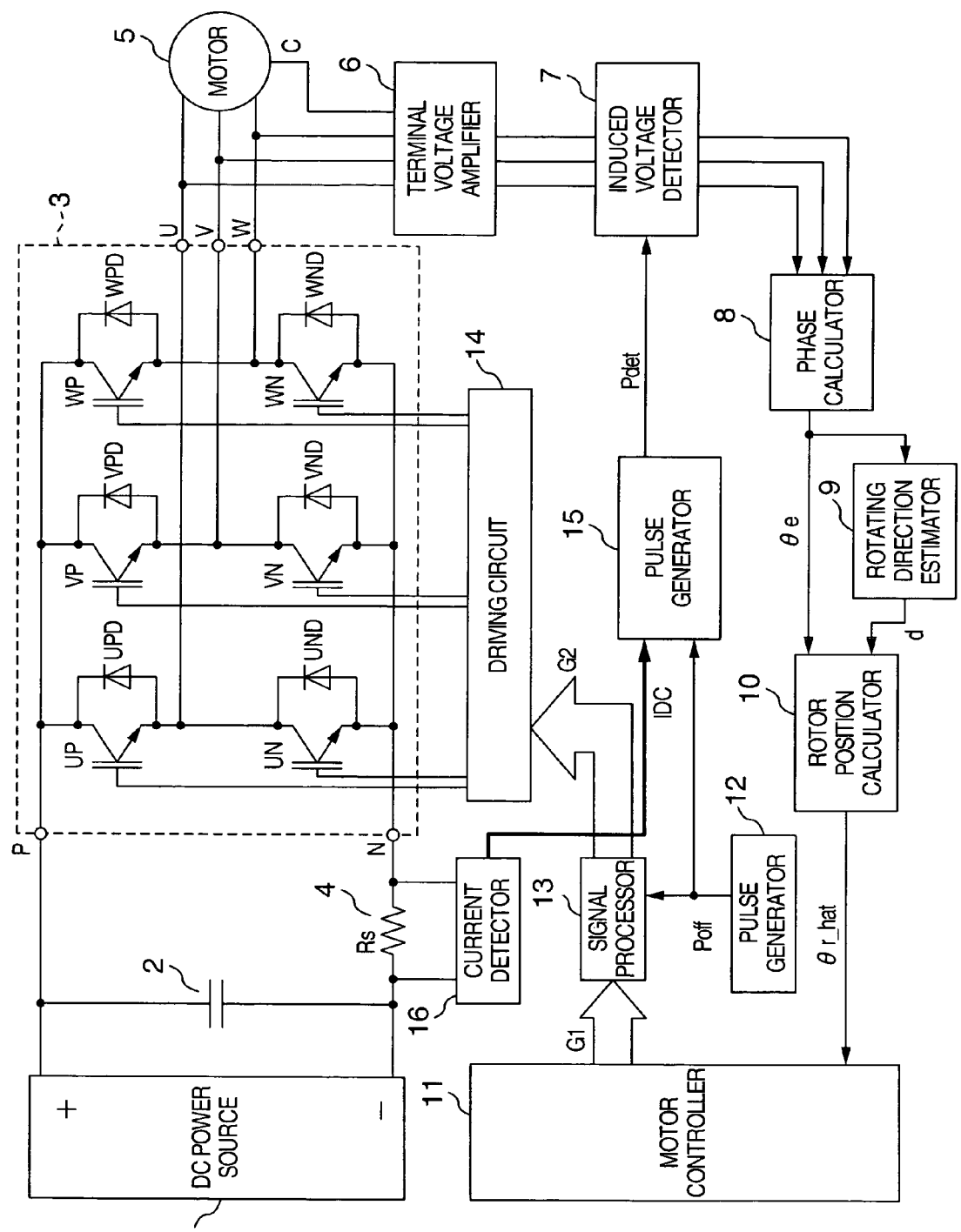
FIG. 13 is an overall control block diagram of a position sensor-less driving system of a permanent magnet synchronous motor in Embodiment 2 of the invention.

In this embodiment, the wait time Tw is set by measuring the current decrease in the free wheel mode. FIG. 13 shows a structural view of this embodiment. Only different portions of the construction will be explained in comparison with FIG. 1 showing the first embodiment. A voltage across both ends of the shut resistor 4 is converted to a current signal IDC by the current detector 16. The current signal IDC is connected to the pulse generator 15.

The current path in the free wheel mode contains the shunt resistor 4 as can be seen from FIG. 10. Therefore, when the voltage across both ends of the shunt resistor 4 is measured, the timing at which the current in the free wheel mode becomes zero can be acquired. The pulse generator 15 shown in FIG. 13 changes the induced voltage detection signal Pdet to the H level simultaneously with the time at which the current signal IDC becomes zero after the change of the all-OFF control pulse signal Poff to the H level or with a predetermined margin time.

When the wait time Tw is determined in the manner described above, the motor terminal voltage measured in the H level of the induced voltage detection signal Pdet is the terminal voltage under the zero state of the motor current. The voltage drop owing to the impedance component of the winding and the mutual induced voltage from other phases do not exist because the motor current is zero, and the voltage of the pure speed electromotive force component can be detected.

Embodiment 3

In the motor driving apparatuses of the first and second embodiments shown in FIGS. 1 and 13, the value of the back electromotive force $K_E$ of the motor during driving is measured in this embodiment and control is executed while the set value is corrected. The explanation will be hereinafter given.

To estimate the rotor position, the induced voltage of the synchronous motor 5 during driving is measured in this embodiment. Because the induced voltages of two or more phases are detected, the peak value of the induced voltage can be determined from the measured voltage unless the output of the induced voltage detector 7 gets into saturation.

When the terminal voltage amplifier 6 employs the phase voltage detection system shown in FIG. 4A, the peak value of the induced voltage in the phase voltage can be determined by using α and β obtained from equation (1).

$$|E| = \sqrt{\alpha^2 + \beta^2} = g \cdot K_E \omega_m \quad (11)$$

It is possible to consider the angular frequency ω1 of the voltage outputted by the inverter during driving of the synchronous motor 5 as being equal to the rotating angular frequency ωm of the synchronous motor. Since the amplification ratio g of the terminal voltage amplifier 6 is known, the value of the back electromotive force $K_E$ can be calculated by the following equation.

$$K_E = \frac{|E|}{g \cdot \omega_1} \quad (12)$$

Similarly, when the terminal voltage amplifier 6 employs the line voltage detection system shown in FIG. 4B, the peak value of the induced voltage in the line voltage and the back electromotive force $K_E$ can be determined by using α and β obtained from equation (3).

$$|E| = \sqrt{\alpha^2 + \beta^2} = \sqrt{3} \cdot g \cdot K_E \omega_m \quad (13)$$

$$K_E = \frac{|E|}{\sqrt{3} \cdot g \cdot \omega_1} \quad (14)$$

According to the embodiments described above, the value of the back electromotive force $K_E$ can be calculated even during the operation. When the variance of the back electromotive force $K_E$ of individual motors as the mass products exists, the motor driving apparatus free from the variance of performance can be accomplished by actually measuring the back electromotive force $K_E$ during the operation and correcting the set value. Furthermore, the quantity of the magnetic flux increases or decrease even in the same motor with the change of the magnet temperature of the motor and the value of the back electromotive force $K_E$ changes, too. The magnet temperature of the motor can thus be estimated from the back electromotive force $K_E$ determined during the operation by utilizing this characteristic of the motor.

Embodiment 4

This embodiment relates to an electric tool equipped with the motor driving apparatus described in Embodiments 1 through 3. The electric tool of this embodiment is excellent in response to a speed instruction and can improve the performance of the tool as will be illustrated below.

When a built-in hammer rotates and impinges against a driver fixing portion in an electric impact driver, a large fastening force occurs at the distal end of the driver owing to the impact force of impingement. When position sensor-less driving of the terminal voltage detection system explained in the prior art is applied to the electric impact driver, the motor speed rapidly increases and decreases upon the impingement, so that the detection cycle of the position of the rotor gets elongated and the response to the speed instruction gets deteriorated.

In the electric impact driver according to this embodiment, on the other hand, the cycle for detecting the rotor position does not change even when the motor speed becomes low. Consequently, the response to the speed instruction can be kept constant and the response during the low speed rotation is excellent.

In tools called "hand grinders" and "router", a drill or abrasives fitted to the distal end are rotated at a high speed by a motor to cut or grind an object such as metals, minerals, resins, and so forth. Because an operator holds the tool such as the hand grinder or the router by hand, a load torque fluctuates depending on the application of force. There is also the case where the drill gnaws into the object and the load torque abruptly increases. In the case of the motor driving system illustrated in this embodiment, the detection cycle of the rotor position remains unaltered even when the motor speed drops due to the abrupt increase of the load torque. In consequence, the response to the speed instruction can be kept constant.

According to this embodiment, further, wiring of the position signal lines is not necessary because the rotor position sensor of the motor is not used. Therefore, the number of wires connecting the synchronous motor and the inverter as the controller to the motor controller can be decreased and portability of the tool can be improved in the apparatus in which the motor is held by hand.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A motor driving apparatus including an inverter for driving a synchronous motor as a load by inputting a DC and converting it to a three-phase AC by power semiconductor switching devices, a driving circuit for driving said power semiconductor switching devices of said inverter and a motor controller for outputting an inverter driving signal to said driving circuit, said motor driving apparatus comprising:
   a first pulse generator for generating a signal that brings said power semiconductor switching devices of said inverter to an OFF level;
   a second pulse generator for inputting the signal of said first pulse generator and generating a signal after the passage of a predetermined wait time;
   an induced voltage detector for inputting the signal of said second pulse generator and detecting a terminal voltage of said synchronous motor as said load;
   a phase calculator for inputting an output of said induced voltage detector and calculating a phase of said induced voltage;
   a rotating direction estimator for outputting a rotating direction estimation value of said motor from the output of said phase calculator; and
   a rotor position calculator for inputting the phase of said induced voltage and said rotating direction estimation value, and outputting the rotor position estimation value to said motor controller.

2. A motor driving apparatus as defined in claim 1, wherein said induced voltage detector detects the terminal voltage of said synchronous motor through a terminal voltage amplifier.

3. A motor driving apparatus as defined in claim 2, wherein said terminal voltage amplifier detects a phase voltage between a neutral point terminal of a stator winding of said synchronous motor as said load and an AC terminal.

4. A motor driving apparatus as defined in claim 2, wherein said terminal voltage amplifier detects a line voltage between AC terminals of said synchronous motor as said load.

5. A motor driving apparatus including an inverter for driving a synchronous motor as a load by inputting a DC and converting it to a three-phase AC by power semiconductor switching devices, a driving circuit for driving said power semiconductor switching devices of said inverter and a motor controller for outputting an inverter driving signal to said driving circuit, said motor driving apparatus comprising:
   a current detection resistor interposed between said inverter and a DC power source;
   a current detector for detecting a current flowing through said current detection resistor;
   a first pulse generator for generating a signal that brings said power semiconductor switching devices of said inverter to an OFF level;
   a second pulse generator for inputting the signal of said first pulse generator and an output of said current detector, and generating a signal after the passage of a predetermined wait time;
   an induced voltage detector for inputting the signal of said second pulse generator and detecting a terminal voltage of said synchronous motor as said load;
   a phase calculator for inputting an output of said induced voltage detector and calculating a phase of said induced voltage;
   a rotating direction estimator for outputting a rotating direction estimation value of said motor from the output of said phase calculator; and
   a rotor position calculator for inputting the phase of said induced voltage and said rotating direction estimation value and outputting the rotor position estimation value to said motor controller.

6. A motor driving apparatus as defined in claim 5, wherein said induced voltage detector detects the terminal voltage of said synchronous motor through a terminal voltage amplifier.

7. A motor driving apparatus as defined in claim 5, wherein said terminal voltage amplifier detects a phase voltage between a neutral point terminal of a stator winding of said synchronous motor as said load and an AC terminal.

8. A motor driving apparatus as defined in claim 5, wherein said terminal voltage amplifier detects a line voltage between AC terminals of said synchronous motor as said load.

9. A motor driving apparatus including an inverter for driving a synchronous motor as a load by inputting a DC and converting it to a three-phase AC by power semiconductor switching devices, a driving circuit for driving said power semiconductor switching devices of said inverter and a motor controller for outputting an inverter driving signal to said driving circuit, said motor driving apparatus comprising:
   a first pulse generator for generating a signal that brings said power semiconductor switching devices of said inverter to an OFF level;
   a second pulse generator for inputting the signal of said first pulse generator and generating a signal after the passage of a predetermined wait time; and
   an induced voltage detector for inputting the signal of said second pulse generator and detecting a terminal voltage of said synchronous motor as said load;
   wherein a rotor position estimation value determined from a phase of the induced voltage determined from the output of said induced voltage detector and a rotating direction estimation value determined from said induced voltage and a back electromotive force of said synchronous motor as said load determined from the induced voltage to be inputted to said induced voltage detector are inputted to said motor controller.

10. A motor driving apparatus as defined in claim 9, wherein said induced voltage detector detects the terminal voltage of said synchronous motor through a terminal voltage amplifier, and said induced voltage detector detects a terminal voltage of said synchronous motor through said terminal voltage amplifier.

11. A motor driving apparatus as defined in claim 9, wherein said induced voltage detector detects a terminal voltage of said synchronous motor through said terminal voltage amplifier, and said terminal voltage amplifier detects a line voltage between AC terminals of said synchronous motor as said load.

* * * * *